Sept. 9, 1969  A. M. A. MAILLET  3,466,416
SPARK EROSION MACHINING PROCESS
Filed March 18, 1965
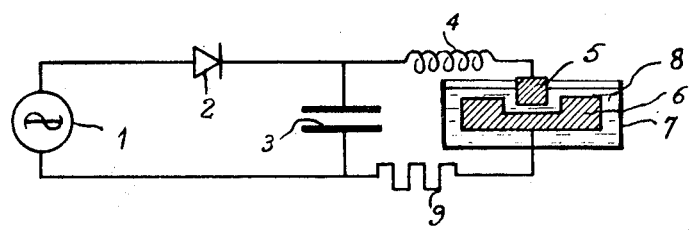
INVENTOR
ALFRED M.A. MAILLET
BY Robert Henderson
ATTORNEY United States Patent Office 3,466,416
Patented Sept. 9, 1969

3,466,416
SPARK EROSION MACHINING PROCESS
Alfred M. A. Maillet, Versailles, France, assignor to La Soudure Electrique Languepin, La Plaine, Saint-Denis, France, a company of France
Filed Mar. 18, 1965, Ser. No. 440,795
Claims priority, application France, Mar. 20, 1964, 968,149
Int. Cl. B23k 9/16
U.S. Cl. 219—69                                    4 Claims

ABSTRACT OF THE DISCLOSURE

For avoiding wear of the electrodes used in electro-erosion devices, there is employed a capacitor periodically discharged in a circuit including a gap between electrode and workpiece, in which circuit inductance, capacitance and resistance are provided and matched together, so that discharge of the capacitor is non-oscillating and effected in a period of time exceeding .0002 of a second. For discharge circuits without additional resistance or with very low resistance, capacitance should be of at least 100 $\mu$f., but inductance should not be greater than 200$\mu$h.

---

The present invention relates to an improved process of machining by spark erosion.

As is known, one of the drawbacks of machining by electro-erosion, achieved by means of electric sparks derived from capacitor discharges, is the electrode wear. It is hardly possible, in practice, to avoid a loss of electrode volume which may amount to as much as 10%, approximately, of the volume of the metal removed from the work.

This drawback is usually put up with by rating down the worn electrodes, i.e. by utilizing these worn electrodes for operational phases approaching more and more the roughing phase (the roughing electrodes themselves being, in turn, discarded after wear), while the new electrodes are set aside for use in the finishing phases.

A high precision machining is thus very difficult to achieve on account of such a high wear of the "tool" as the work is progressing, all the more since said tool is the imprint itself of the work-piece to be obtained.

It is therefore extremely important to reduce to a negligible degree this wear of the electrodes, which, in addition, provides an important saving of the material constituting the same to be achieved, while simultaneously saving the time required for manufacturing them.

I have now found, owing to my experimental work in this field, that there are two main reasons for this rapid wear of the electrodes, namely: the mechanical erosion of the electrode by the particles torn away from the work piece, and the tearing away by the electric field itself of particles from the electrode.

The first cause is closely dependent upon the electrode/workpiece gap. The greater the distance between the electrode and the workpiece, the less objectionable is the flushing back of the particles, torn away from the workpiece, towards the electrode. This flushing back is then slowed down by the liquid dielectric located in said gap. It is however obvious that the wear due to this factor is more difficult to avoid during the finishing steps where the electrode must get very close to the work.

As to the second cause for the electrode wear, and according to my findings, it is the high electric field gradients and their rapid variations that are determinant, in other words, the more sudden and large are the variations of the potential applied to the electrode, the higher will be the wear of the latter.

It is therefore an object of the present invention to provide a method of machining by spark erosion which will substantially reduce the influence of this second factor, without increasing the importance of the first cause, i.e. without substantially reducing the commonly used values for the gap between the electrode and the work-piece.

In the method of machining, wherein a capacitance is made use of, which, on one hand, discharges into the electrode/work gap of a spark erosion machine, according to the invention, the discharge circuit of the capacitor includes an inductance connected in series the value of which is such that, considering the overall resistance of this discharge circuit, the discharge of the capacitor is non-oscillating and is effected in a period of time exceeding one five thousandths, or .0002, of a second.

As will be seen later in the specification, these requiremens result in the use, at least during the roughing step, of capacitors of very high values (several tens of thousands of microfarads), which are charged to comparatively low voltages, so that the discharge is practically an arc of short duration.

For avoiding such an arc, once initiated, to remain alive, one or more known contrivances may be used and more particularly, to charge the capacitor with a rectified A.C. current, either by using only a single half-wave thereof, or by placing across the terminals of the alternator a capacitor tuned to the frequency of the latter and to the inner inductance thereof (U.S. Patent No. 2,922,078, filed Aug. 7, 1958), or by reducing as much as possible the resistance of the load circuit, and by suitably adapting to one another the capacity of the capacitor, the overall inductance of the load circuit and the natural frequency of the alternator (U.S. Patent No. 2,966,574, filed July 16, 1958).

All these known means make use of the periodic polarity reversal of the alternating current to increase the period of time during which the charge across the capacitor has a zero or negligible value, whereas, in a normal A.C. circuit, the passage of the current from one direction to the other is instantaneous. It is thus possible to obtain, during the break in the passage of the current, a deionization of the electrode/work gap, sufficient for the capacitor discharge not to be extended through an arc.

It is moreover advantageous to select, for the alternating charge current, a substantially higher frequency than the frequency of the machining sparks—at least five times this frequency and, preferably, higher for the more intense machining steps. Thus, during the discharge of the capacitor in the electrode/work piece gap several pulses of a unidirectional current may pass through said gap made conductive through the capacitor discharge. For this current of a comparatively high frequency, however, the inductance added in the discharge circuit constitutes a comparatively high impedance, so that this current does not present the character of a short-circuit current and adds but a small amount of energy to the discharge of the capacitor.

Local destruction of the workpiece by arcing is thus avoided.

In addition, and for the same reason, this additional inductive impedance assists in preventing the extension of an arc discharge.

The invention will be best understood from the following detailed description thereof, when read in conjunction with the accompanying drawing, the single figure of which is a connection diagram illustrating, in a simplified manner, the arrangement of a spark erosion machine according to the invention.

In the charging circuit, the alternator 1 charges, through a rectifier 2, a capacitor 3 (which, in practice, consists of a bank of capacitors). This rectifier is arranged to allow the passage of a single half-cycle, so that after each one thereof of a suitable polarity, the current is switched off during the whole length of the following half-cycle.

This charging circuit may be replaced by any other known D.C. or A.C. circuit providing that means are included therein for reducing, after the discharge of capacitor 3, the rate of increase of the charging current thereof. Besides, the charging circuit may also include a transformer with variable taps for adjusting of the charging rate of capacitor 3.

The discharge circuit of this capacitor comprises an inductance 4 and the gap between electrode 5 and work piece 6. As is well known, the electrode and the work piece are dipped in a convenient tank 7 containing a dielectric 8.

In the discharge circuit, there is also shown a resistance 9 which represents the total ohmic resistance of this circuit. This resistance may however be that of the circuit components and the connecting contacts therebetween. Resistors may also be added to make up the adjustments. The overall value of resistance 9 will be designated as R, i.e. the overall value of all the resisting components of the circuit.

Inductance 4, added, according to the invention, to the discharge circuit, has, besides, a value such that the capacitor discharge is non-oscillating, and its duration is at least one five-thousandth, or .0002, of a second.

An approach made by calculation will show what should be the values of the components constituting the circuit, then the results will be given of the tests effected which justify such approximations on which such calculations are based and the results achieved by the invention.

Assume, for instance, that, for rough machining, it is desired to obtain a non-oscillating discharge of the capacitor in 1/400 of a second.

If, temporarily, the discharge curve of the capacitor is assimilated to a quarter-sine wave extending from the maximum thereof to zero, such a discharge will correspond to 1/100-second period of an undamped usual oscillating circuit.

Designating, as usual, by L the self-induction 4 and by C the capacitance of capacitor 3, then:

$$T = 1/100 = 2\pi\sqrt{LC} \qquad (1)$$

It is known, on the other hand, that in order for a discharge of a capacitor to be aperiodic, the resistance of the circuit must be at least equal to the critical value, i.e. that the condition:

$$R \geqslant 2\sqrt{L/C}$$

Should be satisfied (R being, as previously mentioned, the value of resistance 9).

In a normal discharge circuit without additional resistance, the value of R, as evaluated, calculated and measured, is comprised in the range from 0.05 to 0.5 ohm. Assuming this value to be 0.20 ohm, then:

$$2\sqrt{L/C} = 0.20 \qquad (2)$$

Solving Equations 1 and 2:

$L \approx 0.166$ millihenry and
$C \approx 16,600$ microfarads.

It will thus be noted that the value of the capacitors utilized should be at least a hundred times as large as the usual values in series with low-value self-inductances.

It is however important that the surface state of the workpiece which is subjected to the machining operation be comparable to that achieved with the usual procedures, i.e. the craters formed on the machine surface of the workpiece should be of the same size in both cases. The hollow volume of such craters is known to be proportional to the energy of the capacitor, i.e. to ½ CV² with V being the capacitor voltage at the instant of the discharge.

Since the energy increases with the square of the voltage, it will suffice, inversely, with capacitors with a capacity a hundred times as high as the usual capacities, that the voltage be only ten times lower (for instance, 20 volts, instead of 200 volts).

Moreover, on account of the high capacity of the capacitor, and in order to obtain therefrom a rapid charge through separate current half-cycles, the charging voltage may have comparatively high values, of the order of ten times the discharge voltage of the capacitor, i.e. only slightly lower than the usual voltages. This will result in an additional advantage; it is no more necessary in spite of using lower effective machining voltages, to bring the electrode near the workpiece for the discharge of the capacitor to be initiated. Hence, the electrode remains relatively spaced apart from the piece, so that the first cause of the electrode wear mentioned in the preamble, viz the reverting onto this electrode of the particles torn off the workpiece is not enhanced.

In practice, and for rough machining operations, capacitors have been used, connected in series, of 10,000 to 30,000 $\mu$f., in the discharge circuit, with inductances of 30 to 200 $\mu$h.

These capacitors were charged with an A.C. voltage of 160 volts by a half-cycle current at a frequency of 2,500 c./s. Upon discharging of the capacitor, the voltage across the same was about 20 volts. Finally, the electrode/workpiece gap was about 35/100 of a mm.

It will be noted that, for a frequency of 2,500 c./s., an inductance of 100 $\mu$h. corresponds to a nonnegligible impedance of 1.5 ohms.

The machining output ranged between 250 and 1000 c. mm./minute. The machining consisted in blind cavities of a depth of 15 mm., with a wear lower than one percent.

For more reduced machining conditions, it is possible to determine, as before, the order of magnitude of the assembly components to be used.

Assuming it is desired to reduce the aperiodic discharge time of the capacitor to 1/3000 of a second, then, as previously shown:

$$T = 1/3000 = 2\pi\sqrt{LC} \qquad (1)$$

$$R = 2\sqrt{L/C} \qquad (2)$$

If no damping resistance is added in the discharge circuit ($R = 0.20$ ohm), then approximately $L = 25$ $\mu$h. and $C = 2,500$ $\mu$f.

The effective machining voltage is then only a few volts.

It may be desirable to include an additional resistance in the discharge circuit, in order to bring the value of up to 2 ohms, for instance. Then:

$L = 250$ $\mu$h. and $C = 250$ $\mu$f.

The effective machining voltage will then be of about 15 volts.

With a capacitor of at least 100 $\mu$f., a self-induction value of at least 200 $\mu$h. and an additional resistance not greater than 1 ohm, it is possible to obtain experimentally, with peak charge voltages of 100 volts approximately, semi-finishing or intermediate machinings, or finishing machinings with an electrode wear not exceeding 3%.

The wear is substantially higher than in the rough machining condition, since, on one hand, the electrode is closer to the workpiece and, on the other hand, the potential variations as applied to the electrode are more rapid. However, for the finishing of the workpiece, a higher electrode wear ratio may be accepted, since the amounts of metal removed from the workpiece are then more reduced than during rough machining, so that a high relative wear ratio corresponds to a reduced absolute ratio.

It will be realized from the foregoing that many modifications and variations of the embodiments described are possible without departing from the spirit and scope of the invention.

Accordingly, the invention is not to be limited except as set forth by the appended claims.

What I claim is:

1. An apparatus for machining a workpiece by spark-erosion including a source of electric current, a capacitor C charged by said source, and a discharge circuit directly connected to the terminals of said capacitor; said discharge circuit including, in series, an inductance coil, an electrode, a workpiece and a gap between the electrode and the workpiece, said discharge circuit having overall resistance R, and inductance L and the values of C, L and R being so relatively established that the discharge of the capacitor is non-oscillating but not substantially overdamped and is effected in a period of time exceeding .0002 of a second; the source of electric current being the combination of an alternator and rectifying means; the peak voltage of the alternator being several times the voltage of the capacitor at the beginning of the discharge and the period of the alternator current being several times smaller than the duration of the capacitor's charge or discharge.

2. An apparatus according to claim 1, wherein R is less than 0.5 ohm, C is greater than 2500 $\mu$f. and L is between 30 and 200 $\mu$h.

3. An apparatus according to claim 1, wherein R is between 1 and 2 ohms, C is greater than 100 $\mu$f. and L is less than 200 $\mu$h.

4. Apparatus for machining a workpiece by spark-erosion, comprising a capacitor C, a charging circuit connected to the terminals of said capacitor, and a discharge circuit connected to said terminals, the latter circuit including, in series, an inductance L, an electrode, and a workpiece spaced from said electrode to provide an effective sparking gap therebetween, and the latter circuit having an over all resistance R; said charging circuit comprising a source of alternating electric current and, in series with said source, rectifying means limiting the current flow in the charging circuit to only half-wave, intermittent, uni-directional flow; the charging voltage applied to the capacitor being several times the discharge voltage thereof, the relative values of R, L, and C being so established that the discharge factor of said intermittent flow through C is beyond but not substantially beyond critical damping and is effected in a period of time exceeding .0002 of a second, and the period of said alternating electric current of the charging circuit being several times smaller than the duration of the charge or discharge of C.

References Cited
UNITED STATES PATENTS

| | | |
|---|---|---|
| 3,035,149 | 5/1962 | Matulaitis. |
| 3,089,059 | 5/1963 | Porterfield et al. |
| 2,785,279 | 3/1957 | Williams _____ 219—69 |
| 3,283,116 | 11/1966 | Scarpelli _____ 219—69 |

JOSEPH V. TRUHE, Primary Examiner

R. F. STAUBLY, Assistant Examiner